April 25, 1944.    B. B. GRACE ET AL    2,347,258
INDICATOR SYSTEM
Filed July 10, 1941    2 Sheets-Sheet 1

INVENTORS
B. B. Grace
W. H. M. Hellier
BY
ATTORNEY

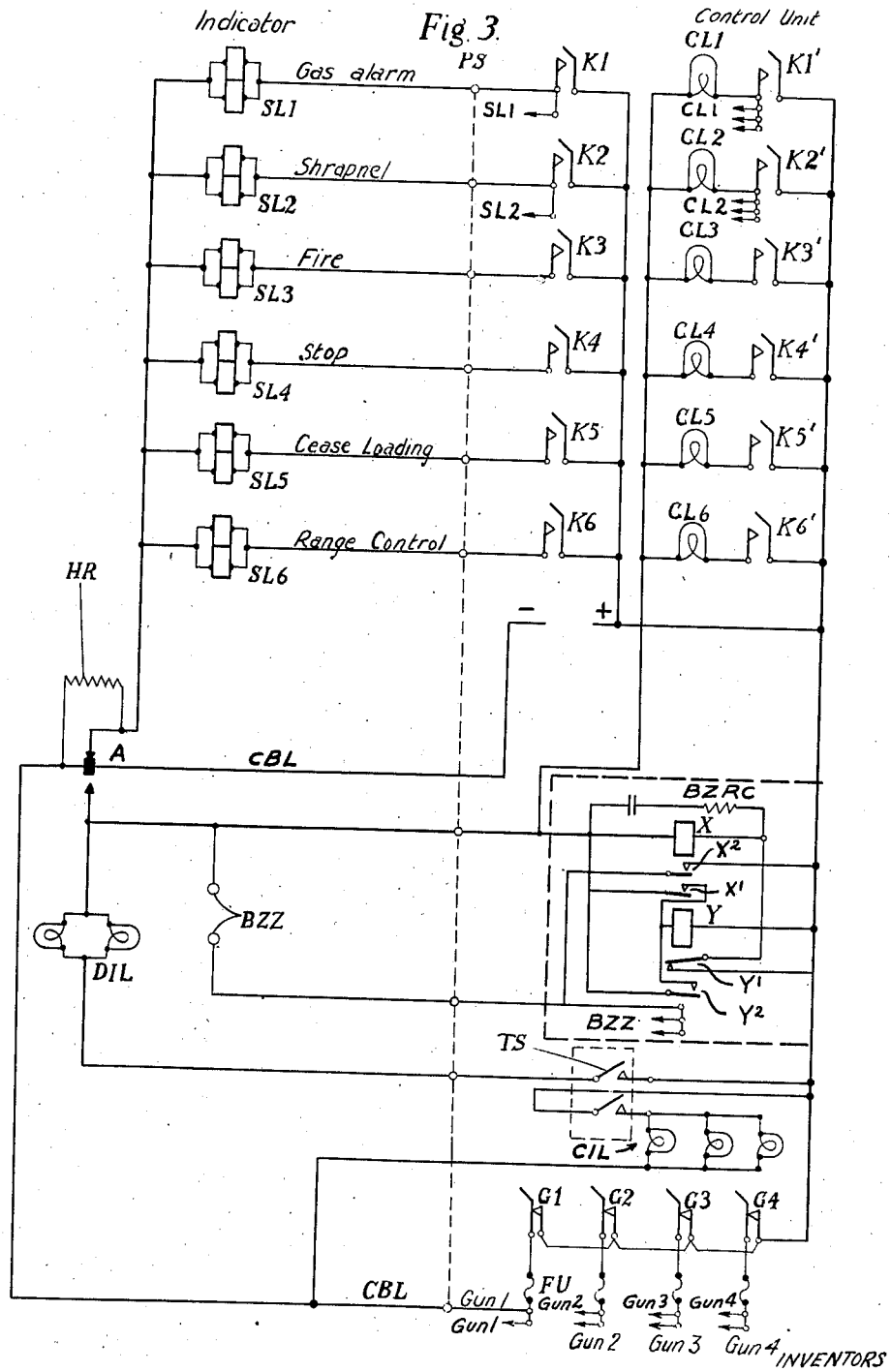

Patented Apr. 25, 1944

2,347,258

UNITED STATES PATENT OFFICE 2,347,258

INDICATOR SYSTEM

Bertram Barnett Grace and William Herbert Morgan Hellier, London, England, assignors to International Standard Electric Corporation, New York, N. Y.

Application July 10, 1941, Serial No. 401,800
In Great Britain May 14, 1940

10 Claims. (Cl. 177—327)

This invention relates to indicators, which are particularly useful as indicators by means of which orders are conveyed from a control position to one or more gun positions in a battery.

Advantages of the invention are the simplicity of the apparatus, whereby the likelihood of faults developing is reduced to a minimum; its robustness; and the certainty of its correct operation. At the same time the equipment is portable and compact, and is extremely economical in its use of electric current. The constructional features are such that the essential parts are well protected from rain if the indicator is located in an exposed position.

One feature of the invention consists in an indicator comprising a group of display plates and a solenoid or solenoids associated with each of said display plates and adapted when energised to project its associated display plate into display position.

A further feature of the invention consists in an indicator comprising in combination a casing having a display window therein, a plurality of display plates within said casing capable of being positioned before said display window, a solenoid or solenoids associated with each of said display plates and a circuit for selectively energising said solenoid or solenoids to position any display plate before the display window.

In order that the invention may be clearly understood, a description will be given of one of its embodiments, reference being made for this purpose to the accompanying drawings, in which:

Fig. 3 is a circuit diagram of an indicator and the associated control unit.

In practice a single control unit is preferably arranged whereby each of its control buttons or switches is connected to operate a plurality of indicator plates. For example one control unit may be provided for a battery of four guns, there being two indicators per gun, making eight indicators in all, and six possible orders for display on each indicator. The indicators of any one or more of the guns can be cut out when desired. Thus the panel of the control unit carries six order keys in a horizontal row, four gun-isolating keys in a vertical row, and an array of indicator lamps, forty-eight in all, one per indicator per order. Red and green indicator lamps are used to distinguish the two indicators associated with the one gun. Beneath the control panel there is a buzzer relay circuit BZRC (Fig 3), together with four cartridge type fuses FU, one per gun. Eight sockets for the cables leading to the several indicators, of the Breeze-pattern are mounted four on each side of the box. A two-pin socket is mounted on one side of the control box for plugging in the battery cord leading to a twenty-four volt battery supply.

Figure 1:
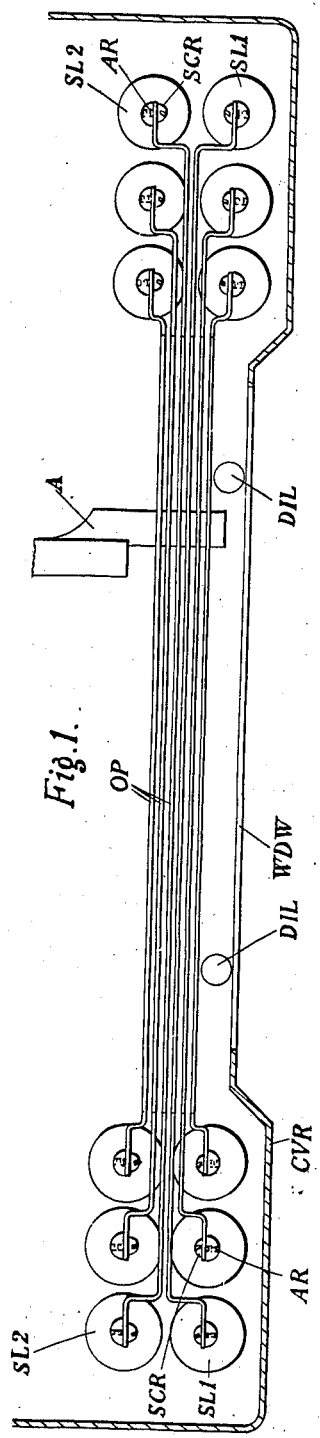
Fig. 1 is a diagrammatic view from beneath of an indicator in accordance with the invention.
Figure 2:
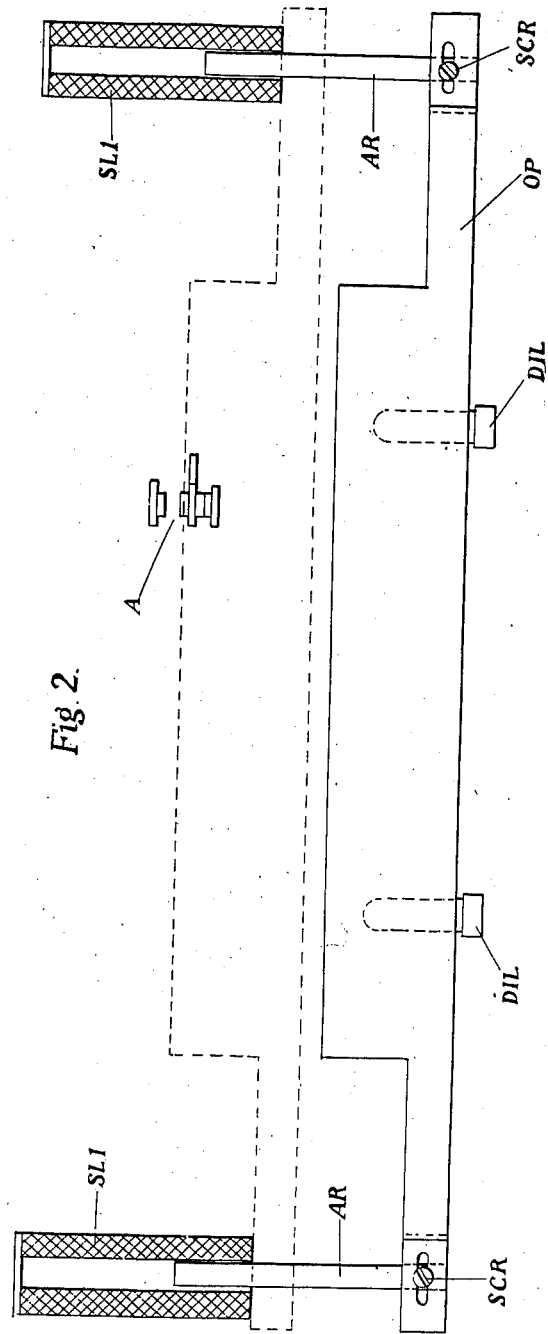
Fig. 2 is a diagrammatic view of the same from the front.

The indicator, shown diagrammatically in Figs. 1 and 2, consists of a cast metal base and a sheet iron cover, housing six pairs of lifting solenoids, six order plates, a buzzer, two lamps, and a set of contacts arranged to be operated when any plate is in display position.

Figs. 1 and 2 show the set of six order plates OP arranged one behind the other and normally resting on the base plate (not shown) where they are out of sight. The order plates are of very light weight. At each end they have horizontal extensions, which are each of such length, and double-bent to such a degree, that the extremities lie underneath the appropriate pair of solenoids SL. The solenoids are thus nested in a very compact manner. Each solenoid has an armature AR in the form of a rod, into the bottom of which is driven a shouldered screw SCR passing through a slot in the extremity of the order plate and allowing free movement of the plate.

In front of the pack of order plates are two display-illuminating lamps DIL, whilst above the pack, and at a height suitable for engagement by any of the plates when the solenoids SL are energised, is a break-and-make contact set A.

There fits over the indicator a cover CVR having a window WDW, in which the order plates can be displayed one at a time when lifted by the solenoids, the lifted positions being shown in dotted lines Fig. 2.

In Fig. 3 the control unit is shown on the right hand side of the vertical dotted line PS and one of its associated indicators is shown on the left; the dotted line representing a division between the devices and circuits of the control and indicator units. The ten points under PS in a vertical row represent plug and socket connections in the horizontally shown leads or wires from the switches K1—K6 to the solenoids SL1—SL6. Thus the number of wires between the control unit and an indicator is four more than the number of orders to be conveyed. The six order keys having contacts K1, . . ., K6 and K1' . . . K6', respectively, each controls two circuits, viz, that to the corresponding solenoids SL1, . . ., SL6 in the indicator, and that to the corresponding pilot lamp CLI, ..., CL6 on the control panel.

If it is desired to give the order "Gas alarm," the keys KI, KI' are thrown, establishing a circuit from positive terminal, through KI, through the two solenoids SLI in parallel, through the normally closed contact A, and back to negative terminal via the common wire CBL, the fuse FU, and the gun isolating key GI. KI' closes a circuit from positive, through lamp CLI, to lower open contact of A. Similar circuits are established simultaneously to the seven other indicators in parallel, except as pairs of these may have been cut out by the throwing of the gun isolating keys GI,..., G4.

When the corresponding order plate OP rises into display position, just before the end of its movement it changes over the mechanical contacts A. This has the effects, firstly of introducing the holding resistance HR into the solenoid circuit by opening upper contacts of A, so that the current for holding the order plate up is reduced substantially below that supplied for bringing it up in the first place; secondly of closing a circuit to the display illuminating lamps DIL from positive over toggle switch TS when closed, lamps DIL, contact A to return cable CBL; thirdly of closing a circuit for the buzzer BZZ; and fourthly of lighting the appropriate check lamp CLI on the control panel over the lower contact A. The display illuminating lamps DIL may be made dependent upon a toggle switch TS in the control unit, as shown or may be permanently wired to light upon closure of A only. The buzzer BZZ is made dependent on the buzzer relay circuit BZRC in the control unit. This circuit BZRC includes two relays X and Y and a slow-releasing arrangement of condenser resistance shunting the relay X, whereby the buzzer operates for about two seconds only. Relay X is operated over a circuit from positive, winding of X, lower contact A, to cable CBL. The relay X is the first to operate, starting up the buzzer BZZ by closing contact X2 and operating relay Y by closing contact XI, relay Y in turn opens the circuit to relay X at contact YI, but maintains itself operated at contact Y2. With release of X the buzzer is cut off at X2, having the relay Y being maintained operative so long as no change is made in the order being displayed.

The toggle switch TS, when closed, provides current for the lamps CIL to illuminate the control panel.

If, while one order is being displayed, another order-key is thrown, the corresponding solenoids will be fed only with the holding current, since the resistance HR will be in circuit, and this holding current is insufficient to bring up a plate. Immediately however the first key is released and the plate drops off, the second plate will come up in its place; at the same time the relay Y will have been released when the contacts A have restored, so that a fresh warning will be given on the buzzer to advise of the change.

If for any reason, such as mechanical shock, the order plate is shaken down from the display position, the resistance HR is cut out by the restoration of contacts A, and the full current is supplied to bring the order plate back into view.

If it is thought desirable, it is possible at the expense of extra wires in the cable, two per order instead of one, to have a positive control of the check lamps CL. For this purpose each plate carries a lug on its upper edge so positioned as to engage with a particular pair of make contacts which then replace contacts KI' ... K6' in a simple check lamp circuits which does not include contacts of the order key. Thus the lighting of the check lamp depends wholly upon the physical fact of the corresponding order plate being in display position.

It will be appreciated that the invention may take other forms; thus there may be one solenoid only for each order-plate. Again the order-plates may be withdrawn from display position by spring means, although that would to some extent detract from the simplicity which is regarded as a valuable feature in such devices.

What is claimed is:

1. An order indicator system for gun positions and the like comprising a control unit located at a control position, a plurality of indicator units operable from said control unit, one for each gun position of a gun battery, a plurality of electro-magnetically operated order signalling devices in each indicator unit, each device of the respective indicator units being for signalling a different order, the indicator units being equipped for signalling individual ones of a like group of orders, a plurality of order keys in said control unit, each provided with contacts for closing a plurality of circuits, circuits connecting the devices in the respective indicator units which signal the same order to the contacts of a corresponding order key whereby closure of an order key will operate a signalling device in each indicator unit to signal the same order, further circuits closed by the operation of each order key, one of said circuits extending from the order key to each of said indicator units, a switch having contacts at each indicator unit in said circuit disposed so as to be closed by the operation of any of said signalling devices, a source of potential connected to said contacts and connected on the closure thereof to said circuit, a signal lamp in said circuit at said control unit operable on the closure of said contacts whereby the operation of all of said order signalling devices may be checked at said control unit and said switch having further contacts connected in series relative to all electromagnetically operated signal devices of each indicator unit and having a resistance connected in shunt relation thereto and operative to permit operation of a signaling device only after opening of the circuit of a previously operated signaling device.

2. An order indicator system as claimed in claim 1, further comprising a buzzer at each of said indicator units, relay means at said control unit individual to each buzzer, circuit means operable in response to the closure of said contact means at said indicator units for operating said relay means, and a circuit for operating said buzzer closed by said relay means.

3. An order indicator system as claimed in claim 1, further comprising a buzzer at each of said indicator units, relay means at said control unit individual to each buzzer, circuit means operable in response to the closure of said contact means at said indicator units for operating said relay means, a circuit for operating the associated buzzer closed by each of said relay means, and means including said relay means for opening said buzzer circuit after a predetermined interval.

4. An order indicator system as claimed in claim 1 further comprising a buzzer at each of said indicator units, relay means comprising a plurality of relays individual to each buzzer at said control unit each relay having a plurality of contacts, circuit means operable in response to the closure of said contact means at said indicator units for operating a first relay of said relay means, an operating circuit for each buzzer closed by the contacts of the first relay of the corresponding relay means on the operation thereof, a second relay in each relay means, an operating circuit therefor closed by the contacts of the first relay associated therewith, and an operating circuit for each of said first relays connected through back contacts of the associated second relay, whereby the operating circuits for the first relays are opened when the second relays operate.

5. An order indicator system as claimed in claim 1 further comprising a buzzer at each of said indicator units, relay means comprising a plurality of relays individual to each buzzer at said control unit each relay having a plurality of contacts, circuit means operable in response to the closure of said contact means at said indicator units for operating a first relay of said relay means, an operating circuit for each buzzer closed by the contacts of the first relay of the corresponding relay means on the operation thereof, a second relay in each relay means, an operating circuit therefor closed by the contacts of the first relay associated therewith, an operating circuit for each of said first relays connected through back contacts of the associated second relay, whereby the operating circuits for the first relays are opened when the second relays operate, and means for delaying the release of said first relays after the opening of the operating circuits therefor whereby the corresponding buzzers continue to operate after the operation of the second relays.

6. An order indicator system as claimed in claim 1 further comprising a buzzer at each of said indicator units, relay means comprising a plurality of relays individual to each buzzer at said control unit each relay having a plurality of contacts, circuit means operable in response to the closure of said contact means at said indicator units for operating a first relay of said relay means, an operating circuit for each buzzer closed by the contacts of the first relay of the corresponding relay means on the operation thereof, a second relay in each relay means, an operating circuit therefor closed by the contacts of the first relay associated therewith, an operating circuit for each of said first relays connected through back contacts of the associated second relay, whereby the operating circuits for the first relays are opened when the second relays operate, and means comprising a delay network connected in shunt with the windings of said first relays for delaying the release thereof, whereby the buzzers are kept in operation for a predetermined interval.

7. An order indicator system as claimed in claim 1 further comprising a buzzer at each of said indicator units, relay means comprising a plurality of relays individual to each buzzer at said control unit each relay having a plurality of contacts, circuit means operable in response to the closure of said contact means at said indicator units for operating a first relay of said relay means, an operating circuit for each buzzer closed by the contacts of the first relay of the corresponding relay means on the operation thereof, a second relay in each relay means, an operating circuit therefor closed by the contacts of the first relay associated therewith, an operating circuit for each of said first relays connected through back contacts of the associated second relay, whereby the operating circuits for the first relays are opened when the second relays operate, means comprising a delay network connected in shunt with the windings of said first relays for delaying the release thereof, whereby the buzzers are kept in operation for a predetermined interval, and a locking circuit for each of said second relays including a front contact thereof and said contacts at said control unit whereby said second relays when once operated remain energized disabling the buzzer circuits until another order is signalled.

8. An order indicator system comprising a group of signal plates, solenoid means operatively connected to each plate when energized to move the plate into display position and to hold it there, circuit connections for the solenoids including a switch having contacts in series relation to all of the solenoids, a resistance connected in shunt with the contacts, said switch being positioned mutual to the plates to be engaged thereby for opening of the contacts when in fully raised position and said resistance reducing the current to a mere holding value whereby full current excitation of the solenoids occurs only after opening of the circuit of a previously operated signal, and control buttons for selective closing of the solenoid circuits.

9. An indicator system as claimed in claim 8 further comprising a further contact engaged by the switch upon opening of the first contacts and connections thereto for closing of indicator lamp and buzzer circuits whereby the latter are operated only when a signal plate is fully elevated.

10. An indicator system as claimed in claim 8 further comprising a further contact engaged by the switch upon opening of the first contact and circuit connections thereto for operating a buzzer, said buzzer circuit connections including relay means operative for opening the buzzer circuit after a predetermined interval.

BERTRAM BARNETT GRACE.
WILLIAM HERBERT MORGAN HELLIER.